(12) United States Patent
Ren et al.

(10) Patent No.: US 10,606,110 B2
(45) Date of Patent: Mar. 31, 2020

(54) DISPLAY PANEL BRACKET

(71) Applicant: BOE TECHNOLOGY GROUP CO., LTD., Beijing (CN)

(72) Inventors: Yan Ren, Beijing (CN); Lei Cao, Beijing (CN); Zifeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/039,501

(22) Filed: Jul. 19, 2018

(65) Prior Publication Data
US 2019/0094601 A1 Mar. 28, 2019

(30) Foreign Application Priority Data
Sep. 26, 2017 (CN) .......................... 2017 1 0884733

(51) Int. Cl.
*G02F 1/1333* (2006.01)
*F16M 11/38* (2006.01)

(52) U.S. Cl.
CPC ....... *G02F 1/133308* (2013.01); *F16M 11/38* (2013.01); *F16M 2200/022* (2013.01)

(58) Field of Classification Search
CPC .............. G02F 1/133308; F16M 11/38; F16M 2200/022; F16M 11/16; F16M 11/22;
(Continued)

(56) References Cited

U.S. PATENT DOCUMENTS 5,388,792 A * 2/1995 Hastings ................ F16M 11/22
248/188.1
5,601,541 A * 2/1997 Swisher .............. A61M 1/0023
128/DIG. 24
(Continued)

FOREIGN PATENT DOCUMENTS

CN 1767556 A 5/2006
CN 101576196 A 11/2009
(Continued)

OTHER PUBLICATIONS

First Office Action for Chinese Patent Application No. 201710884733.X dated Jan. 9, 2019.
(Continued)

*Primary Examiner* — Christopher Garft
(74) *Attorney, Agent, or Firm* — Calfee, Halter & Griswold LLP

(57) ABSTRACT

The application provides a display panel bracket, which includes at least one first bracket installed to the display panel, at least one second bracket serving as a base, and a connector connected between each first bracket and a corresponding second bracket; wherein each second bracket is longitudinally elongated, and the connector is configured to be rotatable so that the display panel bracket has a first state and a second state, wherein in the first state, the length direction of the second bracket is consistent with the thickness direction of the display panel so that the display panel bracket can stably support the display panel, in the second state, the length direction of the second bracket is consistent with the length direction of the display panel.

15 Claims, 6 Drawing Sheets

(1a)

(1b)

(1c)

(58) Field of Classification Search
CPC . G06F 1/16; A47B 91/00; A47B 3/002; F16N 2200/08
USPC .................. 248/688, 917–919, 188.6, 188.1
See application file for complete search history.

(56) References Cited

U.S. PATENT DOCUMENTS

| | | | | |
|---|---|---|---|---|
| 5,934,774 | A * | 8/1999 | Wu | F16M 11/105 248/425 |
| 6,288,893 | B1 * | 9/2001 | Faranda | G06F 1/181 312/223.2 |
| 6,311,941 | B1 * | 11/2001 | Feldmeyer | A47B 97/00 248/188.8 |
| 6,603,656 | B2 * | 8/2003 | Cho | G06F 1/18 16/346 |
| 7,328,880 | B2 * | 2/2008 | Helot | A47B 91/02 248/188.3 |
| 7,550,668 | B2 * | 6/2009 | Chen | H05K 5/0234 174/50 |
| 7,733,645 | B2 * | 6/2010 | Hsu | F16M 11/08 248/188.1 |
| 8,390,996 | B2 * | 3/2013 | Park | F16M 11/24 248/917 |
| 8,654,526 | B2 * | 2/2014 | Wu | H04N 5/64 248/188 |
| 2003/0081376 | A1 * | 5/2003 | Helot | A47B 91/02 361/679.59 |
| 2007/0047188 | A1 * | 3/2007 | Kim | F16M 11/22 361/679.22 |
| 2007/0080271 | A1 * | 4/2007 | Oh | F16M 11/38 248/220.21 |
| 2007/0103605 | A1 * | 5/2007 | Maruta | F16M 11/22 348/797 |
| 2007/0145212 | A1 * | 6/2007 | Yamanaka | F16M 11/22 248/176.1 |
| 2015/0282355 | A1 * | 10/2015 | Wang | H05K 5/0234 361/679.59 |
| 2016/0135311 | A1 * | 5/2016 | Liu | F16M 11/26 361/679.01 |

FOREIGN PATENT DOCUMENTS

| | | |
|---|---|---|
| CN | 204420488 U | 6/2015 |
| CN | 205350775 U | 6/2016 |
| CN | 105965419 A | 9/2016 |
| CN | 205896632 U | 1/2017 |
| KR | 1020100085257 A | 7/2010 |

OTHER PUBLICATIONS

Second Office Action for Chinese Patent Application No. 201710884733.X dated Sep. 2, 2019.

* cited by examiner (2a)

(2b)

(3a)

(3b)

(4a)

(4b)

(9a)

(9b) (9c)

DISPLAY PANEL BRACKET

RELATED APPLICATION

This application claims priority to Chinese patent application No. 201710884733.X filed on Sep. 26, 2017, the entire content of which is hereby incorporated by reference.

FIELD OF THE DISCLOSURE

The application relates to the field of image display devices, in particular to a display panel bracket.

BACKGROUND OF THE DISCLOSURE

Display panels (e.g., LCD televisions, LCD, etc.) often are carried out actions such as boxing, transporting, taking out, displaying, or testing during use. When displaying or testing, the display panel is fixed to a bracket. When long-distance transportation is required after the display or test is completed, the bracket is dismantled, and the display panel and the bracket are separately packaged. In the above process, workers need to use tools for disassembly and assembly. There is a risk that parts will be lost if they are packed separately for transportation. If the display panel and the bracket are not detached and are directly packed together in a box for transportation, the volume of the packing box will be obviously increased, making it inconvenient to carry and store.

Therefore, it is necessary to solve the above technical problems.

SUMMARY OF THE DISCLOSURE

In view of this, the embodiment of the present disclosure provides a display panel bracket. The display panel bracket comprises at least one first bracket installed to the display panel, at least one second bracket serving as a base, and a connector connected between each first bracket and a corresponding second bracket; wherein each second bracket is longitudinally elongated, and the connector is configured to be rotatable so that the display panel bracket has a first state and a second state, wherein in the first state, a length direction of the second bracket is consistent with a thickness direction of the display panel so that the display panel bracket can stably support the display panel, wherein in the second state, the length direction of the second bracket is consistent with a length direction of the display panel.

Optionally, the number of the at least one first bracket is at least two and the number of the at least one second bracket is at least two correspondingly. In the first state, the at least two second brackets are spaced apart from each other and parallel to each other; in the second state, the at least two second brackets are all arranged in a same straight line.

Optionally, the second bracket and/or the first bracket are made of channel steel.

Optionally, the connector comprises a first portion mounted to the first bracket, a second portion mounted to the second bracket, and a pivot portion connected between the first portion and the second portion.

Optionally, the second portion is provided with a sliding groove;

the second bracket comprises a top wall and two side walls, wherein the top wall and the side walls enclose a space. The top wall is provided with an elongated cutout, and the remaining top wall at both sides of the cutout form slide rails;

The slide rails are installed in the sliding groove and can slide relative to the sliding groove.

Optionally, movable friction blocks for squeezing the slide rails are arranged in the sliding groove, and the friction blocks are coupled with the motor through guide rods.

Optionally, the display panel bracket further comprises a pressure sensor for detecting the pressure on the friction blocks. The motor is configured to control a movement of the friction blocks according to the pressure detected by the pressure sensor.

Optionally, the first portion comprises a base part and a mounting portion protruding upward from the middle region of the base part, and the width of the orthographic projection of the mounting portion on the horizontal plane is smaller than the width of the orthographic projection of the base part on the horizontal plane;

the first bracket comprises a bottom wall and two side walls, wherein the bottom wall and the two side walls enclose a space;

the mounting portion of the connector is inserted into the space of the first bracket and is in snugly contact with the inner surfaces of the bottom wall and the side walls, and the lower ends of the bottom wall and the side walls abut against the first surface of the base part.

Optionally, the outer surface of the bottom wall of the first bracket is attached to the back of the display panel;

the bottom wall is provided with a plurality of mounting holes, and a plurality of screws pass through the mounting holes and are screwed into the back of the display panel to fix the display panel with the first bracket.

Optionally, the pivot portion comprises a rotating shaft and a shaft sleeve, and the rotating shaft is rotatably installed in the shaft hole of the shaft sleeve.

Optionally, the rotating shaft comprises a circular main body and a bulge protruding outward from the main body. The shaft hole of the shaft sleeve comprises a circular main body hole for accommodating the main body and an extension groove connected with the main body hole for accommodating the bulge;

the area occupied by the outer periphery of the extension groove is larger than the area occupied by the outer periphery of the bulge.

Optionally, the outer periphery of the bulge occupies 20-40%, e.g., a quarter of the outer periphery of the main body, and the outer periphery of the extension groove occupies 40-60% e.g., a half of the outer periphery of the main body hole.

BRIEF DESCRIPTION OF THE DRAWINGS

FIG. 4b) is a top view of the second bracket and the connector in FIG. 3 (b);

FIGS. 9 (b) and 9 (c) are enlarged schematic views of two cross-sections of the pivot portion taken along a line F-F of the connector shown in FIG. 9 (a), wherein rotation angles of the pivot portion in FIGS. 9 (b) and 9 (c) are different.

DETAILED DESCRIPTION OF THE DISCLOSURE

Exemplary embodiments will be described in detail below, examples of which are shown in the accompanying drawings. When the following description refers to the drawings, unless otherwise indicated, the same numerals in different drawings indicate the same or similar elements. The embodiments described in the following exemplary embodiments do not represent all embodiments consistent with this application. On the contrary, they are only some exemplary examples of devices as claimed in the appended claims.

The terminology used in this application is for the purpose of describing specific embodiments only and is not intended to limit this application. Unless otherwise defined, the technical or scientific terms used in this application shall be the ordinary meaning understood by those skilled in the art to which this disclosure belongs. The use of "an" or "an" and other similar terms in the specification and claims of this application does not indicate a limitation of quantity, but rather indicates the presence of at least one. Similar words such as "comprising" or "including" are intended to indicate that the element or article before "comprising" or "including" now covers the element or article listed after "comprising" or "including" and its equivalents and does not exclude other elements or articles. Similar terms such as "connected" or "coupled" are not limited to physical or mechanical connections, but may include electrical connections, whether direct or indirect. The singular forms "a", "an" and the like used in the specification of this application and the appended claims are also intended to include the plural forms unless the context clearly indicates other meaning. It should also be understood that the term "and/or" as used herein refers to and includes any or all possible combinations of one or more associated listed items.

Figure 1:
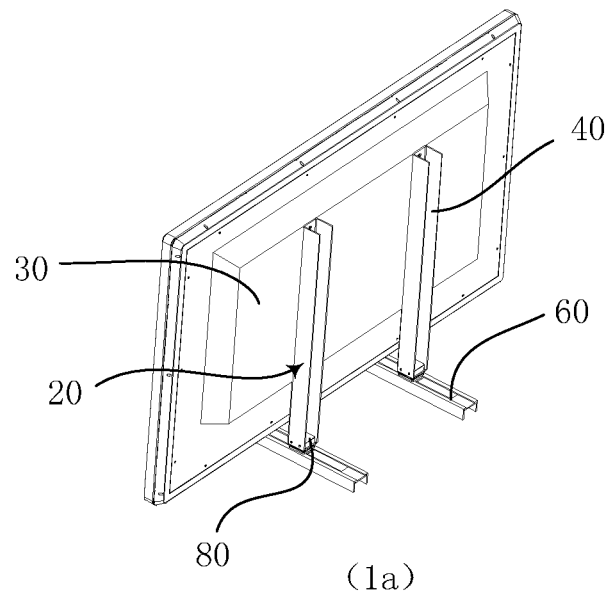
FIG. 1 provides schematic views of a use state of a display panel bracket assembled to a display panel according to an embodiment of the present disclosure, wherein: FIG. (1*a*) is a perspective view of the display panel bracket assembled to the display panel; FIG. (1*b*) is a side view of FIG. (1*a*); FIG. (1*c*) is a rear view of FIG. 1*a*.
Figure 1:
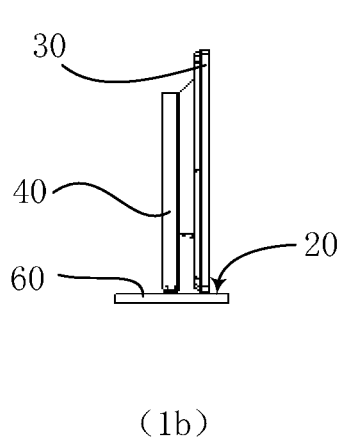
Figure 1:
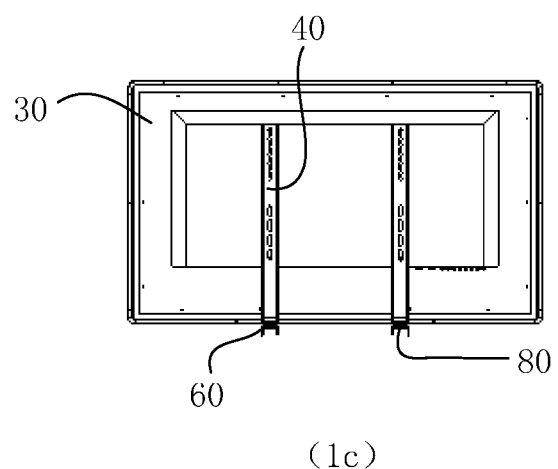
Figure 2:
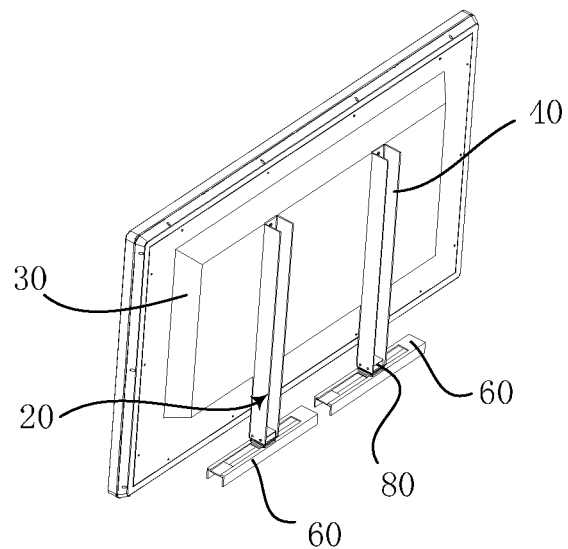
FIG. 2 provides schematic views of another use state of the display panel bracket assembled to the display panel according to an embodiment of the present disclosure, wherein: FIG. (2*a*) is a perspective view of the display panel bracket assembled to the display panel; FIG. (2*b*) shows a top view after an assembly of the display panel bracket and the display panel of FIG. (2*a*) is placed in a packing box.
Figure 2:
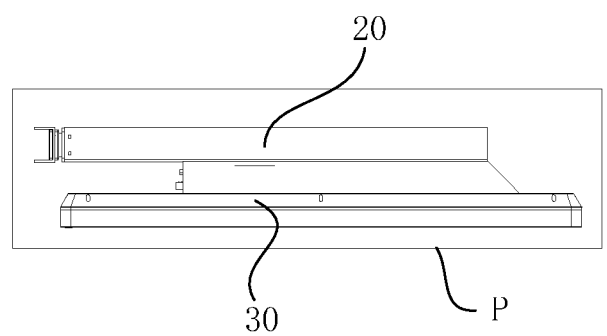

FIGS. 1 and 2 are schematic views of two use states of a display panel bracket assembled to a display panel according to an embodiment of the present disclosure. As shown in FIGS. 1 and 2, the display panel bracket 20 includes a first bracket (i.e., an upper bracket) 40 fixedly connected to the display panel 30, a second bracket (i.e., a lower bracket) 60 as a base, and a rotatable connector 80 connected between the first bracket 40 and the second bracket 60. The first bracket 40 is installed at the upper end of the connector 80 and the second bracket 60 is installed at the lower end of the connector 80, so that the rotation of the connector 80 can realize the change of the relative position between the second bracket 60 and the first bracket 40. Furthermore, the display panel bracket 20 has different states to satisfy different scenes.

The first bracket 40 is groove-shaped or a rod-shaped and extends along the height direction (up and down direction in the figure) of the display panel 30. The second bracket 60 is also groove-shaped or rod-shaped and is arranged in a horizontal plane and can rotate to a certain extent in the horizontal plane. When testing or displaying the display panel 30, the second bracket 60 can be rotated so that its length direction is substantially the same as the front-rear direction (the direction perpendicular to the display surface of the display panel, that is, the thickness direction of the display panel). As shown in FIG. 1. FIG. 1 (a) is a perspective view, FIG. 1 (b) is a side view, and FIG. 1 (c) is a rear view. The second bracket 60 in this state can reliably support the display panel 30 to keep it stable. Furthermore, the connector 80 and the first bracket 40 above it can slide along the length direction of the second bracket 60 together with the display panel 30 fixedly connected to the first bracket 40. This makes it possible to adjust the position of the display panel 30 in the front-rear direction according to actual requirements during testing or display.

When it is necessary to pack and transport the display panel 30, the second bracket 60 can be rotated so that its length direction is substantially the same as the left-right direction (perpendicular to the front-rear direction and the up-down direction, that is, the length direction of the display panel). As shown in FIG. 2 (a). At this time, the entire display panel bracket 20 composed of the second bracket 60, the first bracket 40, and the like is located substantially in the same plane, and the plane is substantially parallel to the plane (display surface) where the display panel 30 is located. In this state, the overall external size (length, width, height) of the display panel bracket 20 and the display panel 30 is not significantly larger than the external size of the display panel 30. This makes it possible to package the display panel bracket 20 and the display panel 30 as a whole by using a packaging box P that originally packaged the display panel 30 or a packaging box P that is only slightly larger than it. As shown in FIG. 2 (b).

It is noted that, the "height direction", "front-rear direction" and "left-right direction" mentioned in this article are all based on the display panel and its display surface. "Height direction" refers to the width direction of the display panel or its display surface, "left-right direction" refers to the length direction of the display panel or its display surface, and "front-rear direction" refers to the thickness direction of the display panel or the direction perpendicular to the display surface.

Figure 3:
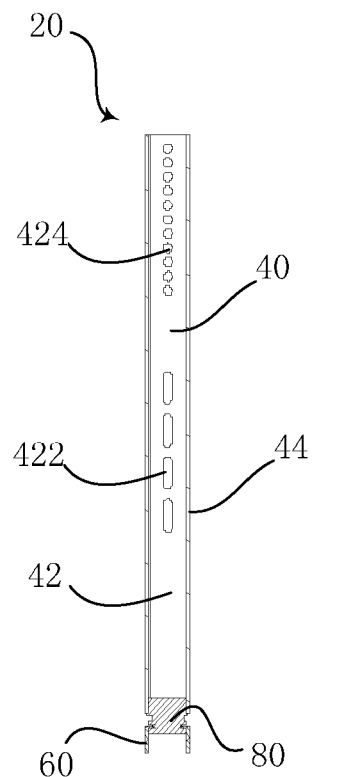
FIG. 3 provides enlarged schematic views of the display panel bracket of FIG. 1 after the display panel is removed, wherein: FIG. (3a) corresponds to the display panel bracket of FIG. 1 (c); FIG. (3b) corresponds to the display panel bracket in FIG. 1 (b)
Figure 3:
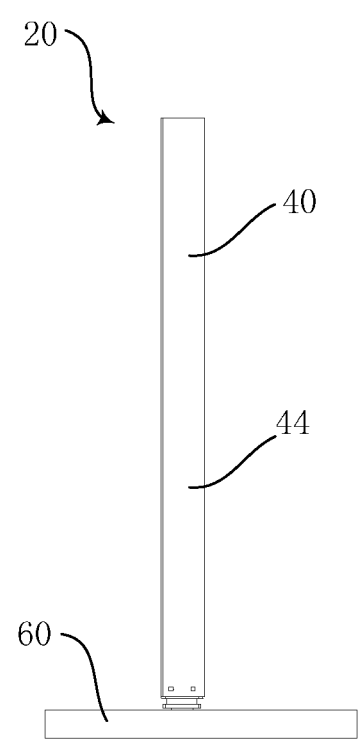

FIG. 3 are enlarged schematic structural views of the display panel bracket 20 of FIG. 1 after the display panel 30 is removed. Wherein, FIG. 3 (a) is a rear view and FIG. 3

Figure 4:
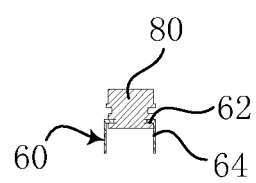
FIG. 4 provides schematic views showing a connection relationship between a second bracket (i.e., the lower bracket) and a connector after a first bracket (i.e., the upper bracket) of the display panel bracket shown in FIG. 3 is removed, wherein: FIG. (4a) corresponds to the second bracket and the connector in FIG. 3 (a)
Figure 4:
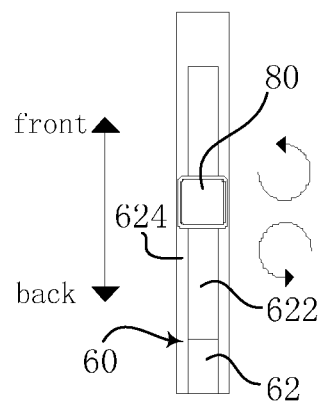
Figure 5:
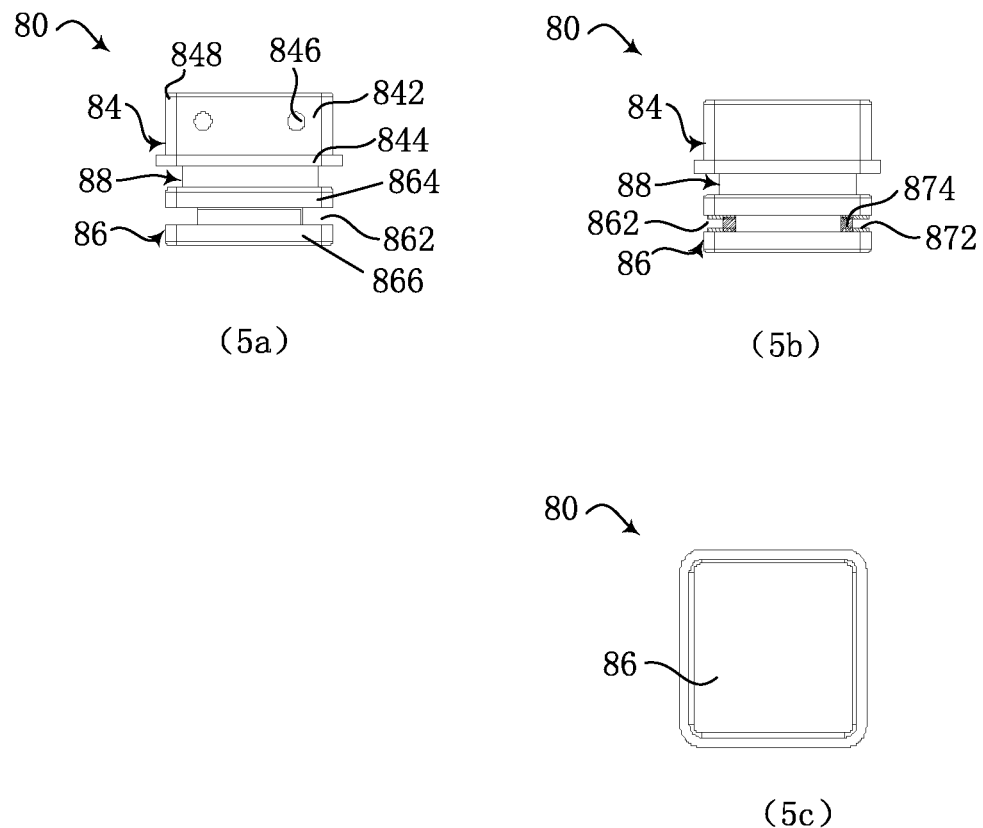
FIG. 5 provides schematic views of a connector in a display panel bracket according to an embodiment of the present disclosure, wherein FIG. (5a) is a front view of the connector, FIG. (5b) is a side view of the connector, and FIG. (5c) is a bottom view of the connector.
Figure 6:
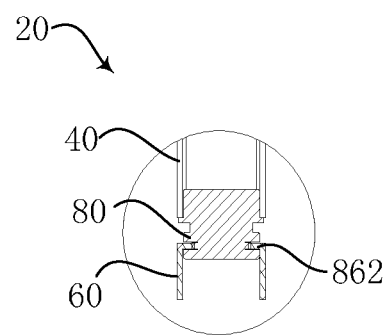
FIG. 6 is an enlarged partial view of FIG. 3 (a)

(b) is a side view. FIG. 4 are schematic structural views of the second bracket 60 and the connector 80 after the first bracket 40 is removed in FIG. 3. FIG. 5 are schematic views of a connector of a display panel bracket according to an embodiment of the present disclosure. FIG. 6 is an enlarged partial view of FIG. 3 (a).

Referring to FIGS. 3 to 6, in combination with FIGS. 1 and 2, the first bracket 40 may be made of channel steel and includes a bottom wall 42 and two side walls 44 which are respectively connected to the left and right ends of the bottom wall 42 and enclose a substantially rectangular space with the bottom wall 42. The horizontal section of the first bracket 40 is generally U-shaped.

The bottom wall 42 of the first bracket 40 is provided with a plurality of mounting holes 424, 422. During assembly, the outer surface of the bottom wall 42 is attached to the back of the display panel 30. The mounting holes 424, 422 and the like in the bottom wall 42 can be aligned with the wall hanging holes in the back of the display panel 30, and then screws are sequentially screwed into the mounting holes 424, 422 and the wall hanging holes. Thus, the display panel 30 and the first bracket 40 can be installed and fixed.

The connector 80 includes a first portion (i.e., an upper portion) 84, a second portion (i.e., a lower portion) 86, and a pivot portion 88 connected between the first portion 84 and the second portion 86. The pivot portion 88 allows the first portion 84 and the first bracket 40 above the first portion 84 to rotate relative to the second portion 86 and the second bracket 60 below the second portion 86.

The first portion 84 includes a base part 844 and a generally rectangular parallelepiped mounting portion 842 protruding upward from a central region of the base part 844. The width of the orthographic projection of the mounting portion 842 on the horizontal plane is smaller than the width of the orthographic projection of the base part 844 on the horizontal plane. The length of the orthographic projection of the mounting portion 842 on the horizontal plane is smaller than the length of the orthographic projection of the base part 844 on the horizontal plane. When assembled with the first bracket 40, the mounting portion 842 of the connector 80 is inserted into the first bracket 40 and is snugly contact with the inner surfaces of the bottom wall 42 and the side wall 44. The lower ends of the bottom wall 42 and the side wall 44 abut against the first surface (i.e., the upper surface in the figure) of the base part 844. To facilitate insertion of the bracket 40, chamfers 848 may be provided at both the edge of the upper end of the mounting portion 842 and the edge of the side portion.

Screw holes 846 are provided in the surface of the mounting portion 842 that is in snugly contact with the side wall 44, correspondingly, mounting holes are also provided in the side wall 44, and screws are sequentially screwed into the mounting holes and the screw holes 846 to fix the first portion 84 of the connector 80 to the first bracket 40.

The second portion 86 is of a generally rectangular parallelepiped structure and is provided with a sliding groove 862 at an intermediate position in the height direction thereof, so that the longitudinal section of the second portion 86 is in an "I" shape. Bounded by the sliding groove 862, the second portion 86 includes a first part 864 located above the sliding groove 862 and a second part 866 located below the sliding groove 862.

The second bracket 60 may be made of channel steel and includes a top wall 62 and two side walls 64 which are respectively connected to the left and right ends of the top wall 62 and enclose a substantially rectangular space with the top wall 62. The longitudinal section of the second bracket 60 is generally inverted "U" shaped.

The top wall 62 is provided with an elongated cutout 622, and part of the top wall remains at both sides of the cutout 622 as slide rails 624. During assembly, the second portion 86 of the connector 80 is clamped to the top wall 62, the second part 866 of the second portion 86 extends into the rectangular space enclosed by the second bracket 60 and is positioned below the top wall 62, and the sliding groove 862 of the second portion 86 receives the slide rails 624 so that the connector 80 and the components above it (including the display panel 30) can slide along the length direction of the second bracket 60.

Figure 7:
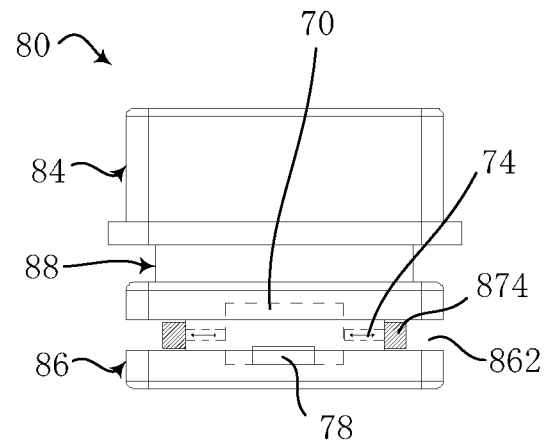
FIG. 7 is a partial cross-sectional view schematically showing an internal structure of a connector of a display panel bracket according to an embodiment of the present disclosure.
Figure 8:
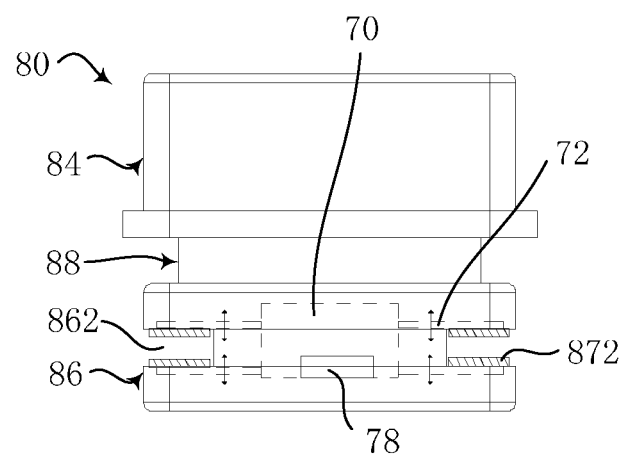
FIG. 8 is a partial cross-sectional view schematically showing another internal structure of a connector of a display panel bracket according to an embodiment of the present disclosure.

FIGS. 7 and 8 are schematic views of two internal structures of connectors of a display panel bracket according to an embodiment of the present disclosure. Referring to FIGS. 1 to 8, the connector 80 may also be provided with friction blocks and other elements to maintain various states of the display panel bracket 20.

A motor 70 may be disposed in the second portion 86 of the connector 80, and a pressure sensor 78 may be disposed at the bottom of the motor 70. A first friction block 874 which can move left and right and a second friction block 872 which can move up and down are arranged in the sliding groove 862 of the second portion 86. The first friction block 874 and the second friction block 872 are respectively coupled to the motor 70 through a first guide rod 74 and a second guide rod 72 so as to be able to drive the first guide rod 74 and the second guide rod 72 to move left and right and move up and down respectively by the motor 70, and then the first guide rod 74 and the second guide rod 72 in turn drive the first friction block 874 and the second friction block 872 to move left and right and move up and down respectively, thereby controlling the sliding state of the connector 80 along the length direction of the second bracket 60.

When the second bracket 60 is moved relative to the connector 80 (i.e., the connector 80 slides relatively along the length direction of the second bracket 60), the first friction block 874 and the second friction block 872 are subjected to a friction force, which is detected by the pressure sensor 78. After receiving the signal from the pressure sensor 78, the motor 70 drives the first guide rod 74 to drive the first friction block 874 to move away from the second bracket 60 (i.e., move inward), and at the same time drives the second guide rod 72 to drive the second friction block 872 to move away from the slide rails 624, reducing the friction between the first friction block 874 and second friction block 872 and the second bracket 60, thereby facilitating the movement of the second bracket 60 in the front-rear direction.

When the second bracket 60 is moved into position and held stationary, the pressure sensor 78 senses no friction force or less friction force. After receiving the corresponding signal from the pressure sensor 78, the motor 70 is activated again and drives the first friction block 874 and the second friction block 872 to move in opposite directions, that is, drives the first guide rod 74 to drive the first friction block 874 to move in the direction close to the second bracket, and at the same time drives the second guide rod 72 to drive the second friction block 872 to move in the direction close to the slide rails 624 so as to squeeze the top wall 62 of the second bracket 60, thereby fastening the second bracket 60 and keeping it in a stable and stationary state.

Figure 9:
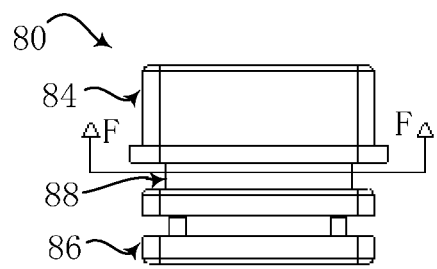
FIG. 9 (a) is a schematic view of a connector of a display panel bracket according to an embodiment of the present disclosure.
Figure 9:
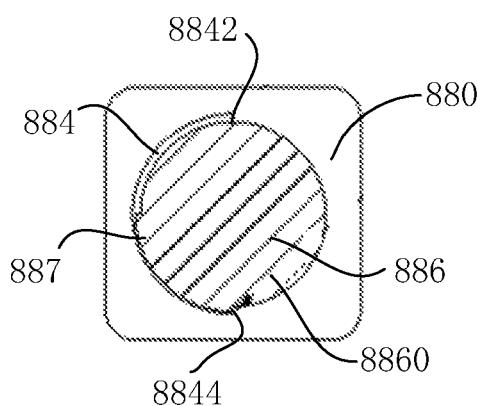
Figure 9:
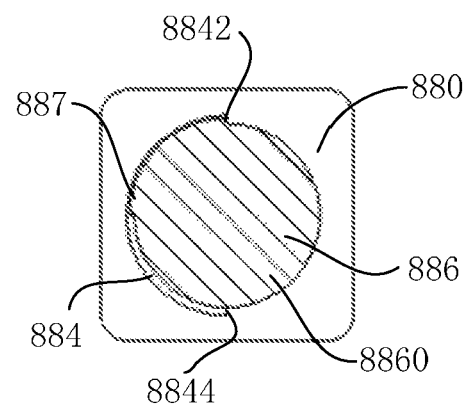

FIG. 9 are schematic views of a connector of a display panel bracket according to an embodiment of the present disclosure. Wherein, FIG. 9 (a) is a plan view of the connector 80, and FIGS. 9 (*b*) and 9 (*c*) are enlarged schematic views of the cross section of FIG. 9 (*a*) at F-F.

Referring to FIG. 9, and if necessary in conjunction with FIGS. 1 to 8, the pivot portion 88 can be a rotating shaft structure with damping, which can stay at any position in the rotation by using the damping effect. The pivot portion 88 includes a rotating shaft 886 and a shaft sleeve 880, and the rotating shaft 886 is rotatably mounted in the shaft sleeve 880. Wherein the rotating shaft 886 may be fixed to the second portion 86. The shaft sleeve 880 can be separately formed and fixed to the base part 844 of the first portion 84. The shaft sleeve 880 can also be formed by defining holes in the bottom surface of the base part 844 of the first portion 84, i.e., the base part 844 with holes in the bottom surface also serves as a shaft sleeve.

The rotating shaft 886 may include a circular main body 8860 and a bulge 887 protruding outward from the main body 8860. In this embodiment, the outer periphery of the bulge 887 occupies 20-40%, for example, 25%, of the outer periphery of the main body 8860.

Correspondingly, the shaft hole in the shaft sleeve 880 for receiving the rotating shaft 886 includes a circular main body hole for receiving the main body 8860, and an extension groove 884 connected to the main body hole for receiving the bulge 887. In this embodiment, the outer periphery of the extension groove 884 occupies 40-60%, for example 50%, of the outer periphery of the body hole. The outer diameter of the bulge 887 is slightly smaller than the outer diameter of the extension groove 884, but larger than the outer diameter of the main body 8860 of the rotating shaft 886.

Since the area occupied by the outer periphery of the extension groove 884 is larger than the area occupied by the outer periphery of the bulge 887, the bulge 887 can rotate within the extension groove 884. The first boundary 8842 and the second boundary 8844 of the extension groove 884 determine the angle at which the bulge 887 can rotate. For example, when the outer periphery of the bulge 887 occupies 25% of the outer periphery of the main body 8860 and the outer periphery of the extension groove 884 occupies 50% of the outer periphery of the main body hole, the angular range in which the bulge 887 and the rotating shaft 886 can rotate is 90. This just meets the needs of the two use states of FIG. 1 and FIG. 2.

The rotation and movement of the first bracket 40 and the second bracket 60 may be manual or automatic. For example, the rotation and movement between them can be realized by motor driving. Correspondingly, an infrared remote controller can also be set to facilitate the user to control the above movements.

According to the display panel bracket 20 of the embodiment of the present disclosure, the second bracket 60 is longitudinally elongated and can rotate relative to the display panel 30, thus having a first state and a second state. During testing and/or display, it can be adjusted to the first state, and the length direction of the second bracket 60 is consistent with the front-rear direction of the display panel 30, so that the first bracket 40 and the display panel 30 can be stably supported. When packing, it can be adjusted to the second state, and the length direction of the second bracket 60 is consistent with the width direction of the display panel 30. In the second state, the display panel bracket 20 and the display panel 30 as a whole occupy less space, so they can be packaged as a whole.

The above description is only a preferred embodiment of this application and is not intended to limit this application. Any modifications, equivalent substitutions, improvements, etc. made within the spirit and principles of this application should be included within the scope of protection of this application.

The invention claimed is:

1. A display panel bracket, comprising:
    at least one first bracket installed to the display panel,
    at least one second bracket serving as a base, and
    a connector connected between each first bracket and a corresponding second bracket,
    wherein each second bracket is longitudinally elongated, and the connector is configured to be rotatable so that the display panel bracket has a first state and a second state, wherein in the first state, a length direction of the second bracket is consistent with a thickness direction of the display panel so that the display panel bracket can stably support the display panel, wherein in the second state, the length direction of the second bracket is consistent with a length direction of the display panel, and
    wherein the connector comprises a first portion mounted to the first bracket, a second portion mounted to the second bracket, and a pivot portion connected between the first portion and the second portion, the pivot portion is configured to allow the first portion to rotate relative to the second portion, and
    wherein the pivot portion comprises a rotating shaft and a shaft sleeve, and the rotating shaft is rotatably installed in a shaft hole of the shaft sleeve.

2. The display panel bracket according to claim 1, wherein a number of the at least one first bracket is at least two and a number of the at least one second bracket is at least two correspondingly; wherein in the first state, the at least two second brackets are spaced apart from each other and parallel to each other; in the second state, the at least two second brackets are all arranged in a same straight line.

3. The display panel bracket according to claim 1, wherein the second bracket and/or the first bracket are made of channel steel.

4. The display panel bracket according to claim 1, wherein the second portion is provided with a sliding groove;
    the second bracket comprises a top wall and two side walls, wherein the top wall and the side walls enclose a space; the top wall is provided with an elongated cutout, and remaining top wall at both sides of the cutout forms slide rails;
    the slide rails are installed in the sliding groove and can slide relative to the sliding groove.

5. The display panel bracket according to claim 4, wherein movable friction blocks for squeezing the slide rails are arranged in the sliding groove, and the friction blocks are coupled with a motor through guide rods.

6. The display panel bracket according to claim 5, further comprising a pressure sensor for detecting a pressure on the friction blocks; wherein the pressure sensor is configured to send a pressure signal to the motor, the motor is configured to receive the pressure signal and control a movement of the friction block in response to the pressure signal.

7. The display panel bracket according to claim 1, wherein the first portion comprises a base part and a mounting portion protruding upward from a middle region of the base part, and a width of an orthographic projection of the mounting portion on a horizontal plane is smaller than a width of an orthographic projection of the base part on the horizontal plane;
    the first bracket comprises a bottom wall and two side walls, wherein the bottom wall and the two side walls enclose a space; and the mounting portion of the connector is inserted into the space of the first bracket and is in snugly contact with inner surfaces of the bottom wall and the side walls, and lower ends of the bottom wall and the side walls abut against a first surface of the base part.

8. The display panel bracket according to claim 7, wherein an outer surface of the bottom wall of the first bracket is attached to a back of the display panel;

the bottom wall is provided with a plurality of mounting holes, and a plurality of screws pass through the mounting holes and are screwed into the back of the display panel to fix the display panel with the first bracket.

9. The display panel bracket according to claim 1, wherein the rotating shaft comprises a circular main body and a bulge protruding outward from the main body; the shaft hole of the shaft sleeve comprises a circular main body hole for accommodating the main body and an extension groove connected with the main body hole for accommodating the bulge; and an area occupied by an outer periphery of the extension groove is larger than an area occupied by an outer periphery of the bulge.

10. The display panel bracket according to claim 9, wherein the outer periphery of the bulge occupies 20-40% of the outer periphery of the main body, and the outer periphery of the extension groove occupies 40-60% of the outer periphery of the main body hole.

11. The display panel bracket according to claim 10, wherein the outer periphery of the bulge occupies a quarter of the outer periphery of the main body, and the outer periphery of the extension groove occupies a half of the outer periphery of the main body hole.

12. The display panel bracket according to claim 6, wherein the friction blocks comprise a first friction block capable of moving left and right and a second friction block capable of moving up and down arranged in the sliding groove of the second portion, the first friction block is coupled to the motor through a first guide rod and the second friction block is coupled to the motor through a second guide rod to be able to drive the first guide rod to move left and right and the second guide rod to move up and down by the motor, and then the first guide rod drives the first friction block to move left and right and the second guide rod drives the second friction block to move up and down, thereby controlling a sliding state of the connector along the length direction of the second bracket.

13. The display panel bracket according to claim 12, wherein the pressure sensor is configured to send a first pressure signal to the motor when the pressure sensor detects that there is a friction force on the first friction block and the second friction block, the motor receives the first pressure signal and drives the first guide rod to drive the first friction block to move away from the second bracket, and simultaneously drives the second guide rod to drive the second friction block to move away from the slide rails in response to the first pressure signal.

14. The display panel bracket according to claim 12, wherein the pressure sensor is configured to send a second pressure signal to the motor when the pressure sensor detects that there is no friction force or less friction force on the first friction block and the second friction block, the motor receives the second pressure signal and drives the first guide rod to drive the first friction block to move in a direction close to the second bracket, and simultaneously drives the second guide rod to drive the second friction block to move in a direction close to the slide rails in response to the second pressure signal.

15. The display panel bracket according to claim 9, wherein an outer diameter of the bulge is slightly smaller than the outer diameter of the extension groove.

* * * * *